(12) United States Patent
Brondijk et al.

(10) Patent No.: US 7,830,760 B2
(45) Date of Patent: Nov. 9, 2010

(54) RECORDER AND METHOD FOR RECORDING INFORMATION ON A WRITE ONCE RECORDING MEDIUM

(75) Inventors: Robert Albertus Brondijk, Eindhoven (NL); Stephanus Josephus Maria Van Beckhoven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 833 days.

(21) Appl. No.: 10/562,274

(22) PCT Filed: Jun. 23, 2004

(86) PCT No.: PCT/IB2004/050972

§ 371 (c)(1),
(2), (4) Date: Dec. 22, 2005

(87) PCT Pub. No.: WO2004/114300

PCT Pub. Date: Dec. 29, 2004

(65) Prior Publication Data

US 2006/0176788 A1    Aug. 10, 2006

(30) Foreign Application Priority Data

Jun. 26, 2003 (EP) ................... 03101898

(51) Int. Cl.
*G11B 27/00* (2006.01)
(52) U.S. Cl. .............. 369/47.13; 369/30.05; 369/30.19; 369/53.37
(58) Field of Classification Search ............... 369/47.1, 369/27.01, 30.1, 47.47
See application file for complete search history.

(56) References Cited

U.S. PATENT DOCUMENTS

| 5,293,566 | A | | 3/1994 | Satoh et al. |
| 6,151,286 | A | * | 11/2000 | Inoue ......................... 369/84 |
| 6,198,708 | B1 | * | 3/2001 | Suzuki .................... 369/53.37 |
| 7,035,969 | B2 | * | 4/2006 | Yoshioka .................... 711/112 |
| 2001/0007544 | A1 | * | 7/2001 | Fujisawa et al. ......... 369/47.12 |
| 2002/0015370 | A1 | * | 2/2002 | Yoshida et al. ........... 369/53.24 |
| 2002/0021629 | A1 | * | 2/2002 | Hitotsui .................. 369/30.05 |
| 2006/0146666 | A1 | * | 7/2006 | Ueda et al. ................. 369/47.1 |

FOREIGN PATENT DOCUMENTS

JP           2-33621          2/1990

(Continued)

OTHER PUBLICATIONS

ANSI X3.301-1997, SCSI-3 Primary Commands (SPC) Jul. 1997.

(Continued)

*Primary Examiner*—Wayne R Young
*Assistant Examiner*—Brian Butcher

(57) ABSTRACT

The continuous update of the Recorded Area Indicator on a DVD+R disc leads to a loss in performance of the recorder. If the update is not continuous, the Recorded Area Indicator on the disc may not accurately reflect the status. In order to ensure that the Recorded Area Indicator accurately reflects the status but avoids loss of performance, the update of the Recorded Area Indicator is performed when a close track session command is issued to the drive signaling the end of the recording, regardless of whether the track or session on the disc remains open. During the recording the Recorded Area Indicator is kept and updated in the memory of the recorder.

6 Claims, 2 Drawing Sheets

FOREIGN PATENT DOCUMENTS

| | | |
|---|---|---|
| JP | 9288883 A | 11/1997 |
| JP | 2001110168 A | 4/2001 |
| JP | 2001351326 A | 12/2001 |
| JP | 2002117649 A | 4/2002 |
| JP | 2002238015 A | 8/2002 |
| JP | 2003263842 A | 9/2003 |
| JP | 2004062989 A | 2/2004 |
| WO | 02086887 A1 | 10/2002 |
| WO | 2004079739 A1 | 9/2004 |

OTHER PUBLICATIONS

The Written Opinion of the International Searching Authority PCT/IB2004/050972.

* cited by examiner

RECORDER AND METHOD FOR RECORDING INFORMATION ON A WRITE ONCE RECORDING MEDIUM

This invention relates to a recorder for recording information on a write once recording medium comprising writing means controlled by a processor where the processing means is operative to perform an update of a recorded area indicator on the write once recording medium.

The invention further relates to a method for recording information on a write once recording medium comprising a recorded area indicator, comprising the step of recording the information on the write once recording medium.

The DVD+R standard defines a Recorded Area Indicator. To speed up the access of the disc, the recorder needs to know in which region of the disc the last written ECC block can be found. For this purpose a bitmap is defined, based on recorded areas with the size of 4 physical sectors, each area corresponding to one ADIP word. 1024 physical sectors on the DVD+R disc have been reserved for this "bitmap" purpose, allowing to division of the disc into maximum 256 regions. The Recorded Area Indicators are used from the outer side of the Table Of Contents zone towards the inner side of the Table Of Contents zone. By means of "HF-detection," the recorder can find the locations of the Recorded Area Informations and determine which contain recorded ECC blocks.

Each region of 640 ECC blocks between PSB=(030000) and PSN=(26053F) corresponds to one Recorded Area Indicator. All regions that contain one or more recorded ECC blocks are indicated by their Recorded Area Indicator.

Whenever ECC blocks are recorded the corresponding Recorded Area indicator must be updated so that the status of the ECC blocks, available for recording or not, is known.

For this the Recorded Area Indicator is updated whenever a recording of ECC blocks occurs.

This leads to a loss of performance of the recorder since time is lost in updating the Recorded Area Information during recording, leading to interruption of the recording of the data because the optical Pickup Unit must relocate from the current position to the Recorded Area Indicator position and back.

The DVD+R standard states that the Recorded Area Indicator shall reflect the actual status of the recordings on the disc when the disc is ejected. Issuing a close track/session command will not only close the track or session but will also cause the Recorded Area Indicator to be updated. This reduces the loss of performance as such but introduces a serious draw back in that a power down without ejection of the disc or issuing of a close track/session command would leave the Recorded Area Indicator not up to date.

It is an object to reduce the loss of performance by the update of the Recorded Area Indicator and at the same time assure that the Recorded Area Indicator reflects the actual status of the disc when the disc is ejected even when the recorder was shut down before ejecting the disc or closing the track or session.

To achieve this objective the recorder according to the invention is characterized in that the processor is operative to perform only the update in response to an update command.

As long as a recording is in progress, the recorder knows what ECC blocks have just been recorded. A constant update is therefore not required and needs to be performed only once. This avoids the loss of performance of the recorder. To ensure that the Recorded Area Indicator reflects the actual status whenever the disc is ejected, the Recorded Area Indicator is updated at the end of the recording operation. When the disc is ejected, the recording operation has already ended and the Recorded Area Indicator is consequently updated, complying with the requirements of the DVD+R standard. Since the update command allows an update without actually closing the track or session, the disc can be ejected with a Recorded Area Indicator that properly reflects the actual status of the disc, yet allows the track or session to remain open for future recording of data.

A power down of the recorder before ejecting the disc will not lead to problems because at the end of the recording operation the Recorded Area Indicator is updated, regardless of whether tracks or sessions remain open. If the recorder is powered down after the update command but before the ejection of the disc, the Recorded Area Indicator accurately reflects the actual status of the disc and the disc is ready for ejection once the recorder is powered up again.

In this way the object of the invention is achieved.

An embodiment of the recorder is characterized in that that the update command is a close track/session command.

The close track/session command marks the end of a recording operation of the disc and is issued at a very suitable moment to update the Recorded Area Indicator. The close track/session command is defined such that the user can use it to either finalize, close or keep the last session or track open. The close track/session command can thereby be issued many times per session. Because the command is issued by the application or user there is control over the exact point in time when the Recorded Area Indicator will be updated. Because the update of the Recorded Area Indicator is user controlled, the performance of the recorder during recording is not affected. The close track/session command is further issued autonomously before an ejection of the disc takes place. When the Recorded Area Indicator is updated whenever the close track session command is issued it is guaranteed that the Recorded Area Information reflects the actual status of the disc when the disc is ejected from the recorder.

When the close track/session command is used to only update the Recorded Area Indicator and not close the track or session, the track or session remains open and future recordings are possible in this track or session.

In one embodiment, a method for recording information on a write once recording medium comprising a recorded area indicator, comprises the steps of:

recording the information on the write once recording medium, followed by performing only an update of the recorded area indicator in response to an update command.

As long as a recording is in progress, the recorder knows what ECC blocks have just been recorded. A constant update is therefore not required and performed only at longer intervals. This avoids the loss of performance of the recorder. To ensure that the Recorded Area Indicator reflects the actual status whenever the disc is ejected, the Recorded Area Indicator is updated at the end of the recording operation. When the disc is ejected, the recording operation has already ended and the Recorded Area Indicator is already updated, complying with the requirements of the DVD+R standard. Because the user or application can use the close track/session command to update the Recorded Area Indicator without closing the track or session, the disc can be ejected with an open track or session yet have a Recorded Area Indicator that reflects the actual status of the ECC blocks on the disc.

A power down of the recorder before ejecting the disc but after the issuing of the update command will also not lead to problems because at the end of the recording operation the Recorded Area Indicator is updated. If the recorder is powered down after this but before the ejection of the disc, the Recorded Area Indicator accurately reflects the actual status of the disc and the disc is ready for ejection once the recorder is powered up again.

In this way the object of the invention is achieved.

A further embodiment of the method according to the invention is chacterized in that the update command is a close track/session command The close track/session command ends a recording operation of the disc and is issued at a very suitable moment to update the Recorded Area Indicator. The close track session command needs to be issued only once per track/session. Therefore the performance of the recorder during recording is not affected. The close track session command is further issued when an update of the Recorded Area Indicator is required. When the Recorded Area Indicator is updated at the end of a recording regardless of whether the track or session is closed, it is guaranteed that the Recorded Area Information reflects the actual status of the disc when the disc is ejected from the recorder.

1.1 CLOSE TRACK/SESSION Command

The CLOSE TRACK/SESSION command, Table 1, allows closure of either a track or a session. If the Multi Session field in the Write Parameters Page (05h) is set to 11b and there is not sufficient space for the next Session, the Session to be closed shall be closed and next Session shall not be allowed. For CD, the Session is closed without the B0 pointer. For DVD-R/-RW, the Session is closed with Lead-out and the Start PSN of the next Border-in field of Lead-in/Border-in set to 0. In the case of insufficient space for the next Session, legacy CD-R/RW Logical Units may generate an error in the above case. In this case, the Inditiator shall change the Multi-Session field in the Write Parameters Page (05h) and retry the Command.

TABLE 1

CLOSE TRACK/SESSION Command Descriptor Block

| Byte | Bit | | | | | | | |
|------|---|---|---|---|---|---|---|---|
|      | 7 | 6 | 5 | 4 | 3 | 2 | 1 | 0 |
| 0 | Operation Code (5Bh) | | | | | | | |
| 1 | Reserved | | | | | | | IMMED |
| 2 | Reserved | | | | | | Session | Track |
| 3 | Reserved | | | | | | | |
| 4 | (MSB) Track Number | | | | | | | |
| 5 | (LSB) | | | | | | | |
| 6 | Reserved | | | | | | | |
| 7 | Reserved | | | | | | | |
| 8 | Reserved | | | | | | | |
| 9 | Control Byte | | | | | | | |

The IMMED bit allows execution of the close function as an immediate operation. If IMMED is zero, then the requested close operation is executed to completion prior to returning status. If IMMED is one, then status is returned once the close operation has begun.

The Session and Track bits (Table 2) have the following meanings:

TABLE 2

Session and Track Bits Definitions

| Session | Track | Close Actions |
|---------|-------|---------------|
| 0 | 0 | Optional behavior for DVD+RW media is defined. If a background format is in progress and De-Icing is not completed, the format De-Icing operation shall be stopped at some DVD+RW ECC block boundary. No further writing shall occur. If the medium mounted is DVD+RW and there is no background format in progress, then no operation shall occur and this shall not be considered an error. If the medium is not DVD+RW or if the optional behavior is not supported, the Logical Unit shall terminate the command with CHECK CONDITION status and set SK/ASC/ASCQ values to ILLEGAL REQUEST/INVALID FIELD IN CDB. |
| 0 | 1 | Close the track associated with the track number in the CDB. For CD, if this is the incomplete track, the Logical Unit shall pad with all zero main data to the minimum length of 4 seconds. No other padding shall be done. If this is the partially recorded or empty reserved track, the Logical Unit shall pad the track. In the case of an empty track, the Logical Unit shall write the track according to the write parameter page. If the write parameter page is inconsistent with the PMA, CHECK CONDITION status shall be returned and SK/ASC/ASCQ shall be set to ILLEGAL REQUEST/ILLEGAL MODE FOR THIS TRACK. For a partially recorded reserved track, the Logical Unit shall continue writing in the same mode as the data already recorded. For DVD-R/-RW, if this is the Partially Recorded Reserved Track or the Empty Reserved Track, the Logical Unit shall pad the Track with 00h bytes. If the Track status is Invisible, no close operation is to be done. In the case of an Incomplete Track, no padding is to be done and cached RMD shall be written into the RMA. For all other media types, this command shall be terminated with CHECK CONDITION status and SK/ASC/ASCQ values shall be set to ILLEGAL REQUEST/INVALID FIELD IN CDB. |
| 1 | 0 | Close Session. If all Tracks in the last Session are not complete, generate a CHECK CONDITION status and set SK/ASC/ASCQ values to ILLEGAL REQUEST/SESSION FIXATION ERROR - INCOMPLETE TRACK IN SESSION. Alternatively, if an empty or partially recorded, reserved Tracks exist in the incomplete Session, generate CHECK CONDITION status and set SK/ASC/ASCQ values to ILLEGAL REQUEST/EMPTY OR PARTIALLY WRITTEN RESERVED TRACK. Behavior of the closing operation is dependent on the Multi-Session field in the Write Parameters Page (05h). |

TABLE 2-continued

Session and Track Bits Definitions

| Session | Track | Close Actions |
|---|---|---|
| | | Closing an empty Session does not produce an error and a write to the media shall not occur.<br>If a MRW background format is in progress, the format operation shall be stopped and the disc shall be structured for removal according to the MRW format. In particular, if a lead-out is required for access by a read-only device, then a lead-out shall be written.<br>If a DVD+RW background format is in progress, the format operation shall be stopped and the disc shall be structured for removal according to the DVD+RW 4.7 Gbytes Basic Formats Specifications for the specific purpose of providing DVD-ROM read compatibility. In general, this means that a [partial] lead-in shall be written, a [temporary] lead-out shall be appended and all unrecorded gaps between lead-in and lead-out shall be format written. For DVD-RW media, when the last session is in the intermediate state, Lead-in and/or Border-out are recorded to make the session complete. (if the session is to be closed that is the first one, Lead-in and Border-out shall be recorded. If the session is to be closed that is second or later one, only the Border-out shall be recorded.) |
| 1 | 1 | For DVD-RW media, if the disc is in restricted overwrite mode and the last session is complete state and Lead-out is not written, Lead-out shall be appended after the last Border-out. If the last session is intermediate state, Border-out and Lead-out is recorded. If the disc is not formatted, the Logical Unit shall report CHECK CONDITION status and set SK/ASC/ASCQ values to ILLEGAL REQUEST/INVALID FIELD IN CDB. For all other media this condition is Reserved, not valid. |

If a Session or Track is to be closed that is already closed, no error shall be reported.

If Session bit is set to zero and Track bit is set to one, the Track Number field indicates the number of tracks to close. Byte 4 and Byte 5 of the CDB shall be ignored if the Session bit is set to one.

For a CD to close the incomplete track, the following steps are required:

1. If necessary, the track is padded with all zero main data to the minimum length of 4 seconds.
2. The PMA is consulted in order to locate the largest track number recorded, 'N'.
3. The boundaries of the track are determined and a PMA entry is written for track N+1. Closing a Track shall cause cached information for the specified Track to be committed to the medium prior to closing.

For CD Closing a Session shall cause the Lead-in and Lead-out to be written for the incomplete Session. Closing a Session when the last session is closed shall not be considered an error. Closing a session when the last session is empty shall cause no actions to be performed and shall not be considered an error. For DVD-R/-RW, closing an incomplete or intermediate Session shall cause the Lead-in or Border-in and Border-out to be written for the incomplete or intermediate Session. If the Multi-Session field in the Write Parameters Page (05h) is set to 00b, a Lead-out shall be appended to last Border-out. Once the Lead-out has been written for DVD media, data cannot be further appended to the medium.

During a Close Track/Session operation that began with the IMMED bit set to one, the Logical Unit shall respond to commands as follows:

a) In response to all commands except REQUEST SENSE, INQUIRY, GET CONFIGURATION, and GET EVENT/STATUS NOTIFICATION the Logical Unit shall return CHECK CONDITION status and set SK/ASC/ASCQ to NOT READY/LOGICAL UNIT NOT READY/LONG WRITE IN PROGRESS or NOT READY/LOGICAL UNIT NOT READY/OPERATION IN PROGRESS unless a reservation conflict exists, in that case RESERVATION CONFLICT status shall be returned.

b) In response to the INQUIRY, GET CONFIGURATION, GET EVENT/STATUS NOTIFICATION commands, the Logical Unit shall respond as commanded.

c) In response to the REQUEST SENSE command, unless an error has occurred, the Logical Unit shall return with SK/ASC/ASCQ values set to NOT READY/LOGICAL UNIT NOT READY/LONG WRITE IN PROGRESS or NOT READY/LOGICAL UNIT NOT READY/OPERATION IN PROGRESS (02h/04h/07h), with the sense key specific bytes set for progress indication. See ANSI X3.301:1997, SPC standard for sense key specific field location.

Closing a Track or Session shall cause a Class 1 Event when the command is issued if the Logical Unit becomes NOT READY. A Class 1 Event shall occur if the medium returns to READY or if the medium becomes un-writable. Other Class 1 Events may occur due to closing a Track or Session.

In DVD+R, the invention can be implemented by utilizing an unused combination of Track and Session for DVD+R. Such a combination is Track=0 and Session=0. Currently, a drive is to report an error to this command with this parameter, but when implementing this invention, the drive reports success and only the RAI will be updated. The rest of the disc is not changed.

For BLURAY Write Once discs, a similar approach can be followed. In the case of BLURAY discs, a structure with the same effect of the RAI can be implemented.

The invention will now be described based on figures.

In the description of the figures it should be kept in mind that the functionality of the close track/session command is extended by the invention to include the option to issue the close track/session command to update the Recorded Area Indicator without closing the track or session that is still open.

Figure 1:
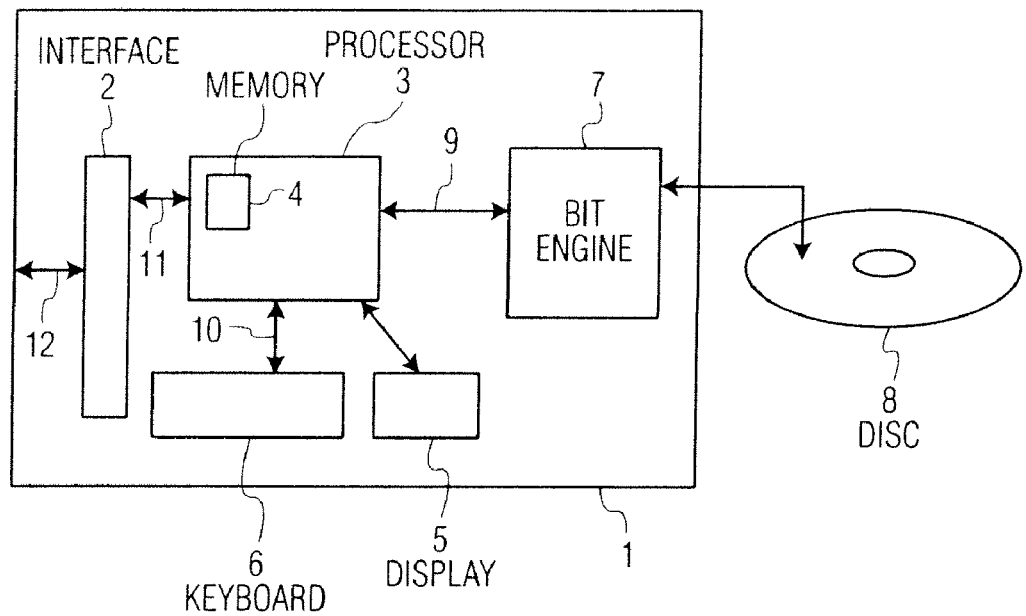
FIG. 1 shows a recorder according to the invention.

The recorder 1 comprises an interface 2 that allows the issuing of commands to the recorder through a connection 12, the transfer of data to the recorder, the retrieval of data from the recorder and the read-out of resulting messages from the recorder in response to the issued commands. The interface 2 transfers the data, commands and resulting messages to and from the processor 3 through connection 11. The processor 3 is connected to a display 5, a keyboard unit 6 (through connection 10) and to a memory 4 for temporarily storing information. The processor 3 is further connected to a bit engine 7 through connection 9 that comprises means for recording data on the recording medium 8 and for retrieving data from the recording medium 8.

The processor also controls the loading means (not shown) for loading the record carrier in the recorder. When data is to be recorded a session is opened using a command presented to the recorder 1 via the interface 12. The processor 3 parses the command and takes the appropriate actions. One of those actions is to open an actual session on the record carrier 8. An open session indicator is stored in the memory 5 in a specific location so that the recorder can at any moment determine whether a session is open or not. The data is subsequently recorded on the record carrier 8. For this the processor provides the data in the right format to the bit engine 7 via the bit engine interface 9. When the recording is finished a close track/session command is issued to the recorder 1 via the interface 12. The processor 3 parses the command and either closes the track/session on the record carrier 8 via the bit engine 7 or leaves the track/session open, if appropriate deletes the open session indicator from the memory 5, determines which ECC blocks have been recorded when the track/session was open and updates the Recorded Area Indicator on the record carrier 8 by recording the correct information via the bit engine 7 in the Recorded Area Indicator on the record carrier.

If the recorder 1 is powered down before the record carrier is ejected, the record carrier remains in the recorder 1 comprising the updated Recorded Area Indicator. If the recorder 1 receives the eject disc command via the interface 12, the recorder 1 operates the loading means (not shown) to eject the record carrier comprising the updated Recorded Area Indicator.

Figure 2:
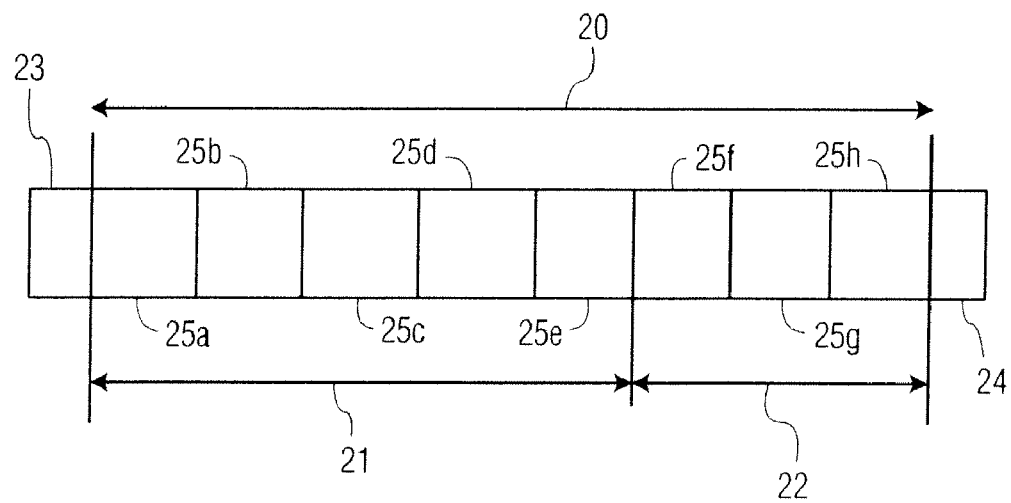
FIG. 2 shows the Recorded Area Indicator as used by the invention

FIG. 2 shows the Recorded Area Indicator as used by the invention The Recorded Area Indicator 20 comprises several Recorded Area Indicator blocks 25a, 25b, 25c, 25d, 25e, 25f, 25g, 25h

Each region of 640 ECC blocks between PSN=(030000) and PSN=(26053F) corresponds to one Recorded Area Indicator block 25a, 25b, 25c, 25d, 25e, 25f, 25g, 25h. All regions that contain at least one recorded ECC block are indicated in the corresponding Recorded Area Indicator block 25a, 25b, 25c, 25d, 25e, 25f, 25g, 25h as recorded. The Recorded Area Indicator 20 is preceded by Table Of Contents blocks 23 and followed by Guard Zone 1 blocks 24. As an example FIG. 2 shows three Recorded Area Indicator blocks 25f, 25g, 25h that indicate recorded ECC blocks 22, while the remaining Recorded Area Indicator blocks 25a, 25b, 25c, 25d, 25e indicate that the corresponding ECC blocks 21 are not yet recorded.

Figure 3:
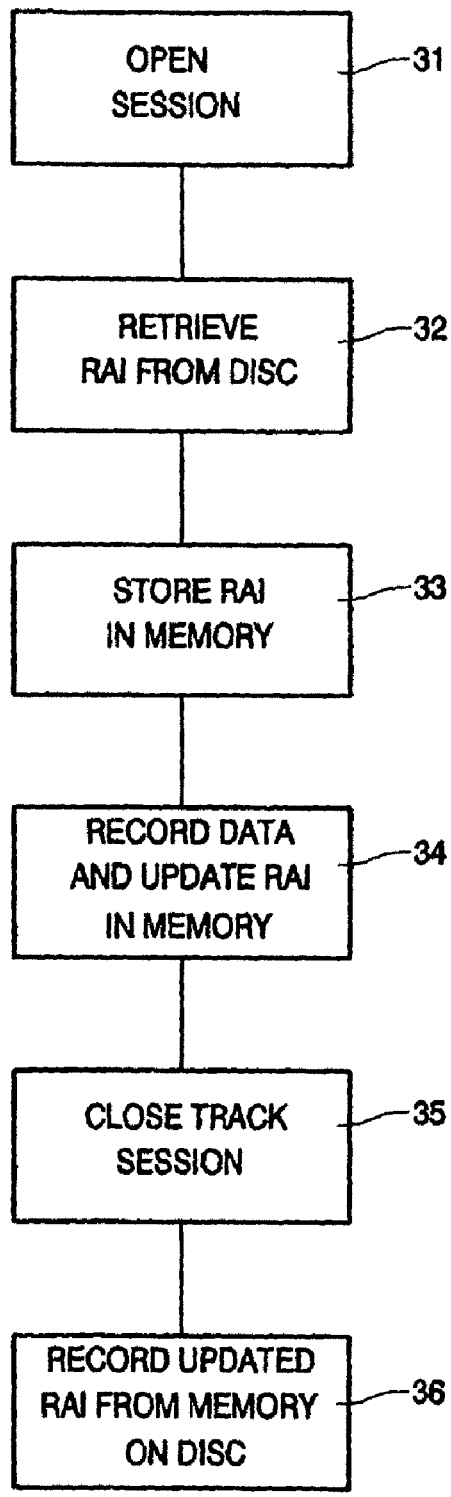
FIG. 3 shows the steps of the method.

FIG. 3 shows the steps of the method.

The method comprises 6 steps 31, 32, 33, 34, 35, 36.

The first step 31 include opening a session using a command when data is to be recorded. The second step 32 comprises the retrieval of the Recorded Area Indicator from the record carrier. The third step 33 comprises the storage of the Recorded Area Indicator in a memory. The fourth step 34 comprises the recoding of the data and the update of the Recorded Area Indicator stored in the memory to reflect that certain ECC blocks on the record carrier have been recorded. Once the recording of data is completed, the fifth step 35 can be executed, which comprises the updating of the Recorded Area Indicator and if appropriate closing of the track/session. Once the close track/session command is executed, the updated Recorded Area Indicator is retrieved from the memory and stored on the record carrier in the sixth step 36. This results in a record carrier with a Recorded Area Indicator that reflects the actual status of the recorded ECC blocks on the record carrier.

The invention claimed is:

1. A recorder for recording information on a write once recording medium comprising a writer controlled by a processor, wherein the processor is operative to perform an update of a recorded area indicator on the write once recording medium in response to an update command provided by a user of the recorder, wherein in response to the update command, only update of the recorded area indicator is performed and a track or a session of the write once recording medium is not closed, the track or the session remaining open for future recordings in the track or the session, wherein the update command is a close track/session command.

2. A method for recording information on a write once recording medium comprising a recorded area indicator, comprising the acts of:
    recording the information on the write once recording medium using a recorder, and
    performing an update of the recorded area indicator in response to an update command provided by a user of the recorder,
    wherein in response to the update command, only update of the recorded area indicator is performed and a track or a session of the write once recording medium is not closed, the track or the session remaining open for future recordings in the track or the session, wherein the update command is a close track/session command.

3. The recorder of claim 1, wherein the recorded area indicator is retrieved from a memory of the recorder and stored on the write once recording medium in response to the update command.

4. The method of claim 2, wherein the recorded area indicator is retrieved from a memory of the recorder and stored on the write once recording medium in response to the update command.

5. The recorder of claim 1, wherein for the track or the session is closed in response to the update command when there is not sufficient space for a next session.

6. The method of claim 2, further comprising the acts of:
    setting a multi session field indicating required space for sessions; and
    closing the track or the session in response to the update command when there is not sufficient space for a next session.

* * * * *